United States Patent
Sjöberg et al.

(10) Patent No.: US 8,918,953 B2
(45) Date of Patent: Dec. 30, 2014

(54) FILTER UNIT FOR VACUUM CLEANER

(75) Inventors: Fredrik Sjöberg, Stockholm (SE); Ulrik Danestad, Stockholm (SE)

(73) Assignee: Aktiebolaget Elctrolux, Stockholm (SE)

( * ) Notice: Subject to any disclaimer, the term of this patent is extended or adjusted under 35 U.S.C. 154(b) by 0 days.

(21) Appl. No.: 14/000,635

(22) PCT Filed: Feb. 21, 2012

(86) PCT No.: PCT/EP2012/052917
§ 371 (c)(1),
(2), (4) Date: Oct. 28, 2013

(87) PCT Pub. No.: WO2012/113782
PCT Pub. Date: Aug. 30, 2012

(65) Prior Publication Data
US 2014/0041150 A1    Feb. 13, 2014

Related U.S. Application Data

(60) Provisional application No. 61/445,300, filed on Feb. 22, 2011.

(30) Foreign Application Priority Data

Feb. 23, 2011    (SE) ...................................... 1100119

(51) Int. Cl.
*A47L 9/20*    (2006.01)
*A47L 9/12*    (2006.01)

(52) U.S. Cl.
CPC . *A47L 9/20* (2013.01); *A47L 9/125* (2013.01); *Y10S 55/03* (2013.01); *Y10S 15/08* (2013.01)
USPC .......... 15/352; 55/304; 55/DIG. 3; 15/DIG. 8

(58) Field of Classification Search
CPC .......................................................... A47L 9/20
USPC ............. 15/347, 352, DIG. 8; 55/304, DIG. 3
IPC .......................................................... A47L 9/20
See application file for complete search history.

(56) References Cited

FOREIGN PATENT DOCUMENTS

| EP | 1523916 A2 | 4/2005 |
|---|---|---|
| GB | 614540 A | 12/1948 |
| WO | 2007117196 A1 | 10/2007 |

OTHER PUBLICATIONS

International Search Report mailed May 16, 2012 in corresponding International Application No. PCT/EP2012/052917.

*Primary Examiner* — David Redding
(74) *Attorney, Agent, or Firm* — Banner & Witcoff, Ltd.

(57) ABSTRACT

A filter unit (100) for a vacuum cleaner includes a filter body (110) and a dust removing means (120). The filter body is elongated and at least partly flexible and the dust removing means is configured to collapse and expand the filter body in response to a force applied on the dust removing means. The filter body comprises pleats (115) extending along the filter body. The filter unit of the present invention is advantageous in that it reduces clogging and thereby increases the efficiency of the vacuum cleaner.

20 Claims, 4 Drawing Sheets

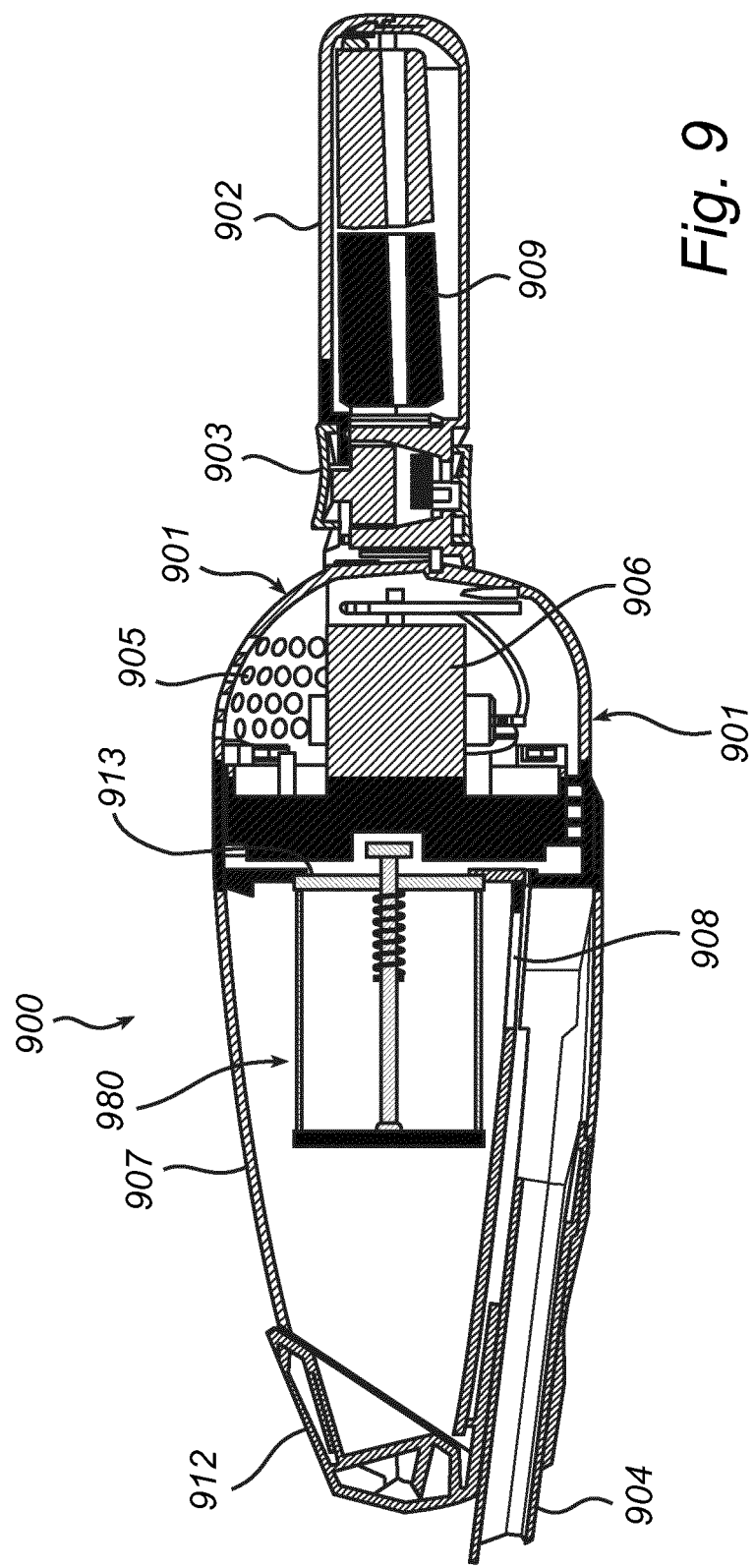

FILTER UNIT FOR VACUUM CLEANER

TECHNICAL FIELD

The present invention relates to the field of vacuum cleaners, and in particular to a filter unit for a vacuum cleaner.

BACKGROUND

Vacuum cleaners are commonly used household appliances for removing dust and debris from various surfaces.

Generally, a vacuum cleaner has a filter for removing dust from dust laden air flowing through the vacuum cleaner. After some time of usage dust adheres to the filter surface which leads to a pressure drop and reduced vacuum cleaning efficiency. Thus, cleaning of the filter is necessary to remove the particulate matter, such as dust, hair and fibers, from the filter. Drawbacks of prior art filters are that they are often not easy to clean. Further, prior art filters require sometimes water to be cleaned, thereby rendering the filter unusable for vacuum cleaning during the time needed for drying off. Further, in case of a clogged filter, it is also common to replace the filter with a new one for regaining vacuum cleaning efficiency, which costs extra.

WO2007/117196 discloses a hand held vacuum cleaner comprising a housing with a dust container having an inlet for dust laden air, a filter unit with a filter body and a motor fan unit for generating a flow of air through the inlet and through the filter unit. The filter body is flexible and the vacuum cleaner further comprises dust removing means configured to collapse and expand the flexible filter body in response to a force applied to the dust removing means. Although such a solution provides a vacuum cleaner that is relatively easy to use with a filter that is dry, the efficiency of the vacuum cleaner is still limited.

Thus, there is a need for providing new filters (or filter units) that would address at least some of the above mentioned issues.

SUMMARY

An object of the present invention is to wholly or partly overcome the above disadvantages and drawbacks of the prior art and to provide an improved alternative to the above technique.

Generally, it is an object of the present invention to provide a filter unit for a vacuum cleaner resulting in improved vacuum cleaning capacity.

This and other objects of the present invention are achieved by means of a filter unit having the features defined in the independent claim. Preferable embodiments of the invention are characterized by the dependent claims.

Hence, according to the present invention, a filter unit for a vacuum cleaner is provided. The filter unit comprises a filter body and a dust removing means. The filter body is elongated and at least partly flexible and the dust removing means is configured to collapse and expand the filter body in response to a force applied on the dust removing means. Further, the filter body comprises pleats extending along the filter body and the dust removing means is configured to twist the filter body, preferably at an angle comprised in the range of about 10-360 degrees, and even more preferably in the range of about 30-90 degrees.

The present invention makes use of an understanding that the filter body may comprise pleats, thereby increasing the interaction surface between the filter body with any dust laden air which the filter unit is intended to filter. As a result, more dust is collected at the surface of the filter body and the risk for clogging is reduced. The inventors have realized that a filter unit may be equipped with a dust removing means for collapsing and expanding the filter body and may also be equipped with pleats extending along the filter body of the filter unit, which increases the active surface area of the filter body and thereby facilitate good performance of the vacuum cleaner over time.

The filter unit of the present invention is advantageous in that it is user-friendly in that the filter body can be cleaned by simply activating the dust removing means. A force applied on the dust removing means causes adhered dust to fall off when the filter body collapses and expands.

Further, the filter unit of the present invention is advantageous in that it relies on a dry cleaning process (i.e. not requiring any water to be cleaned). As a result, the filter unit can be cleaned rapidly and the filter unit may be immediately reused to continue cleaning (with the vacuum cleaner). In contrast, prior art filter units with cleaning processes relying on the use of water require a drying process, which is time-consuming.

According to an embodiment, the pleats may extend along a direction for expansion of the filter body from a collapsed state to an expanded state. In this respect, it will be appreciated that the pleats do not necessarily extend in a direction parallel to the central axis of the filter body. For example, if the filter unit is conically-shaped, the pleats extending along (the surface of) the filter body extend in a direction intersecting the central axis of the conically-shaped filter body. However, in e.g. a cylindrically-shaped filter unit, the pleats may axially extend along the filter body, i.e. the pleats may extend in a direction substantially parallel to the central axis of the cylindrically-shaped filter body.

According to an embodiment, the dust removing means is further configured to twist the filter body. The present embodiment is advantageous in that an even more effective cleaning is provided in that the dust collected (or adhered) at the filter body more effectively falls off the filter body (thanks to a stronger ejection effect sensed by the adhered dust). Further, as the cleaning of the filter unit of the present invention is more effective, the cleaning does not need to be repeated as often as for prior art filter units. By twisting the filter body, the filter body can be even more compressed (i.e. even more compact when being in the collapsed state) and the energy released during the decompression is even stronger.

The dust removing means is configured to twist the filter body at an angle comprised in the range of about 10-360 degrees and preferably in the range of about 30-90 degrees. It will be appreciated that the available twist angle may depend on the material constituting the body filter and/or the size, and in particular the length (along the elongated side), of the body filter.

According to an embodiment the dust removing means is configured to collapse the filter body, preferably to a length in the range of about 10-80% of the un-collapsed length, and even more preferably in the range of about 30-50% of the un-collapsed length.

In particular, the dust removing means may be configured to twist the filter body simultaneously to the collapse and/or expansion of the filter body. Several alternatives may be envisaged. For example, the dust removing means may be configured to, in a first moment (after e.g. application of a force on the dust removing means), sequentially collapse and twist the filter body such that the filter body is in a twisted and collapsed state. Then, during a second moment (after e.g. release of the force applied on the dust removing means), the dust removing means may be configured to simultaneously twist and expand the filter body such that it retrieves its initial state (i.e. as it was before application of the force on the dust removing means). The motion resulting from the twist and expansion of the filter body during the second moment provides a strong ejection force on the dust collected at the filter body, thereby providing a more effective cleaning of the filter unit. In another alternative, the dust removing means may, in the first moment, simultaneously twist and collapse the filter body (instead of sequentially).

According to an embodiment, the filter body may be made of a material arranged to maintain the filter body in an expanded state. In other words, the filter body may be made of a resilient material. For example, the filter body may be made of a semi-rigid material, wherein the material is sufficiently flexible to provide a collapsible filter body when a force or pressure is applied on the dust removing means and sufficiently rigid to maintain the filter body in an expanded state when no force is applied on the dust removing means. In the present embodiment, the material of the filter body has the property to retrieve its initial shape (such as e.g. with a shape memory material and in particular a shape memory polymer) such that the filter unit continuously retrieves its expanded state (or expanded position) once a force applied on the dust removing means (and thereby on the filter body) is released. The present embodiment is advantageous in that the filter body itself is arranged to maintain (or return to) its expanded position without the need of any specific external means.

According to another embodiment, the dust removing means may be configured to continuously apply a force on a portion of the filter body for expanding the filter body. In particular, the filter unit may comprise a resilient or elastic element, such as a spring, adapted to exert the continuously applied force, which is an effective way of expanding the at least partly flexible filter body (also referred to as the collapsible filter body in the following). For example, the filter body may be a cone mounted on an axle connected to a spring which makes it possible to pull the axle and collapse the filter. From the collapsed state or position, the axle can be released which makes the spring push the filter cone into its original state or position. This movement stretches the filter body (or filter media) and applies energy to it, thereby dislodging dust from the filter body. Alternatively, the dust removing means itself may be made of a material which, without application of a force, is arranged to maintain the dust removing means, and thereby the collapsible filter body, in an expanded state.

According to an embodiment, the dust removing means may comprise a rod connected to a portion of the filter body. The rod may be arranged to move the filter body between a collapsed state (or collapsed position) and an expanded state (or expanded position). The rod may for example be manually operated such that, when a force is applied on the rod (e.g. by pulling the rod), the filter body is in a collapsed (and optionally twisted) state, and, once the rod is released (by e.g. pushing the rod, i.e. moving the rod in a direction from the portion of the filter body at which it is connected to an opposite portion of the filter body, or by simply releasing the rod), the filter body retrieves its expanded state. The present embodiment is cost efficient in terms of production and contributes to a low overall cost for the implementation of the present invention.

According to an embodiment, the filter body may be substantially tube-shaped, cylindrically-shaped or conically-shaped and/or the cross-section of the filter body may be substantially elliptical, circular, rectangular or quadratic. Although the above defines already a large variation of possible profiles and geometries of the filter body, it will be appreciated that the present invention is not limited to the above listed profiles and geometries. In particular, referring to a filter body having an elliptical cross-section, it will be appreciated that the filter body does not need to be rotationally symmetrical. Generally, the filter body is advantageously bag-shaped with a top edge and a bottom edge between which the pleats extend along the surface of the filter body.

According to an embodiment, the filter body may be arranged to collapse inwardly. In other words, the space or volume required by the filter body in its collapsed (and twisted) state is less than the space or volume required in its expanded state. The present embodiment is advantageous since the filter unit may further comprise a coarse pre-filter body at least partially encompassing the collapsible filter body and the space between the collapsible filter body and the coarse pre-filter body is often limited. The coarse pre-filter (body) is normally adapted to filter rather large particles such as fibers and hair while the collapsible filter (body) is arranged downstream of the coarse pre-filter (body) and adapted to trap somewhat finer particles of dust.

According to an embodiment, the filter body may comprise at least one stiff edge at which the pleats terminate, which is advantageous in that it provides a more mechanically stable filter unit. In particular, either one or both of the top and bottom sides or edges of the collapsible filter body between which the pleats extend (i.e. the edge at which the pleats terminate and the opposite edge of the filter body at which the pleats start) may be rigid.

According to an embodiment, the filter body may be made of a soft spun-bond material, plastics or a mesh material. The spun-bond material may for example be nylon, polyester, polypropylene, or PET, i.e. any strong elastic (synthetic) polyamide material. The material is advantageously fashioned into sheets, thereby facilitating the manufacturing of the filter unit.

According to an embodiment, the filter unit may further comprise a sealing element arranged at a portion of the filter body opposite to the portion of the filter body in direction of which the filter body is arranged to collapse (i.e. on the top portion of the filter body). The present embodiment is advantageous in that the sealing element, e.g. a rubber sealing disc, provides a tight and hermetical sealing with e.g. a coarse pre-filter encompassing at least partially the collapsible filter body. In such a configuration, each time the collapsible filter body is pulled back (i.e. compressed), the sealing element arranged on the outside of the top portion of the filter body makes it possible for the dislodged dust to enter into a dustbin or dust container of the vacuum cleaner.

According to an embodiment, there is provided a vacuum cleaner comprising a filter unit as defined in any on of the preceding embodiments. The vacuum cleaner of the present invention is advantageous in that clogging at the filter unit is decreased and, thus, the amount of air flowing through the vacuum cleaner is increased, thereby providing a more efficient vacuum cleaner.

In particular, the vacuum cleaner may comprise a housing with a dust container comprising an inlet arranged to receive dust laden air and a motor fan unit for generating a flow of air through the inlet and the filter unit.

Further objectives of, features of, and advantages with, the present invention will become apparent when studying the following detailed disclosure, the drawings and the appended claims. Those skilled in the art will realize that different features of the present invention can be combined to create embodiments other than those described in the following.

BRIEF DESCRIPTION OF THE DRAWINGS

The above, as well as additional objects, features and advantages of the present invention, will be better understood through the following illustrative and non-limiting detailed description of preferred embodiments of the present invention, with reference to the appended drawings, in which:

FIG. 9 schematically shows a vacuum cleaner according to an embodiment of the present invention.

All the figures are schematic, not necessarily to scale, and generally only show parts which are necessary in order to elucidate the invention, wherein other parts may be omitted or merely suggested.

DETAILED DESCRIPTION

With reference to FIGS. 1-4, there is shown a filter unit 100 according to an embodiment of the present invention.

Figure 1:
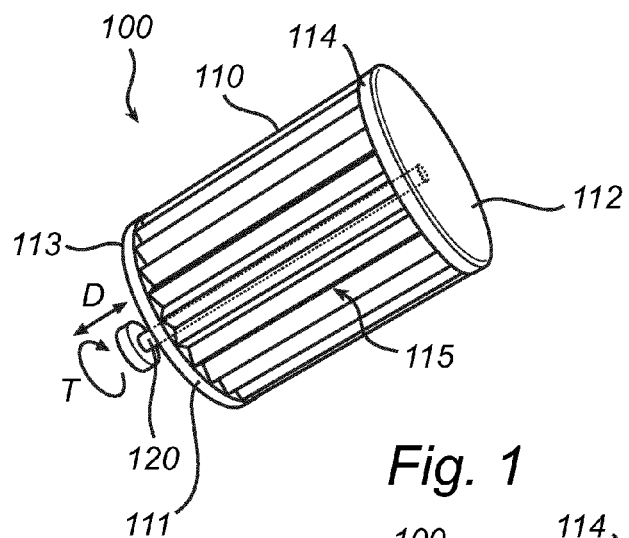
FIG. 1 schematically shows a filter unit for a vacuum cleaner according to an embodiment of the present invention.

FIG. 1 shows a three-dimensional schematic view of the filter unit 100. The filter unit 100 comprises a filter body 110 being elongated and at least partly flexible and a dust removing means 120 configured to collapse and expand the filter body 110 in response to a force applied on it. The filter body 110 further comprises pleats 115 extending along the filter body 110.

Figure 2:
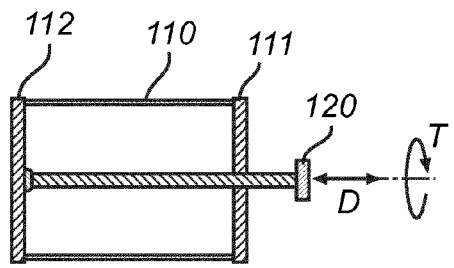
FIG. 2 schematically shows a cross-sectional view of the filter unit shown in FIG. 1 in an expanded state.

As depicted in e.g. FIG. 1, the pleats 115 extend from a bottom portion (or edge) 111 of the filter body 110 to a top portion (or edge) 112, opposite to the bottom portion 111, of the filter body 110. In other words, the pleats 115 may extend along a direction of expansion of the filter body 110 from a collapsed position, wherein the top portion 112 of the filter body 110 is pressed in direction to the bottom portion 111 of the filter body 110, as shown in e.g. FIGS. 3 and 4, to an expanded position, as shown in FIGS. 1 and 2.

The filter body 110 may comprise a first stiff edge 113 at the periphery of the bottom portion 111 (or first end 111 of the filter body 110) at which the pleats terminate and a second stiff edge 114 at the periphery of the top portion 112 (or second end 112 of the filter body 110, which is opposite to the first end 111) at which the pleats terminate.

The filter body may be made of a soft spun-bond material, plastics or a mesh material. The material preferably is a fabric having an open texture with evenly spaced holes. The space between the holes and/or the size of the holes determine the type and size of particles that can be trapped by the filter body. The material of the at least partly flexible filter body is adapted to filter dust laden air and, in particular, adapted to trap rather fine particles, normally smaller than e.g. fibers, hair and the like.

The dust removing means 120, e.g. provided as a rod such as shown in FIGS. 1-4, is arranged to move the filter body from an expanded state to a collapsed state, as indicated by the arrow denoted D in the figures. The filter body 110 may for example be positioned in its collapsed state by manually pulling the rod 120. It will be appreciated that, although it is herein described that the filter body 110 may be collapsed by manually pulling a rod, it is also envisaged that an operator may simply press a button or the like for activating the dust removing means 120. The dust removing means may then be pulled automatically, e.g. using an electrically based system comprising a motor or a system based on magnetic forces, in response to the button being pressed.

Figure 3:
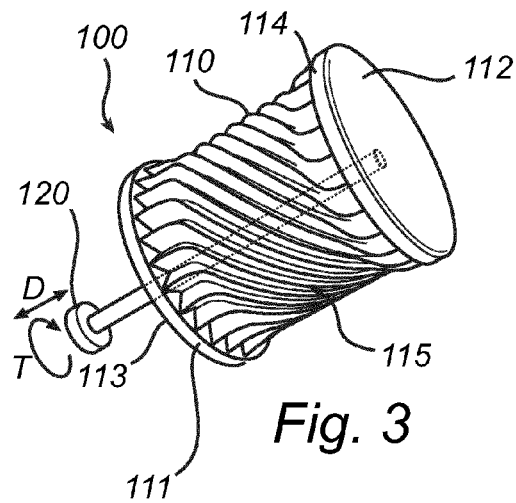
FIG. 3 schematically shows the filter unit shown in FIG. 1 in a collapsed state.
Figure 4:
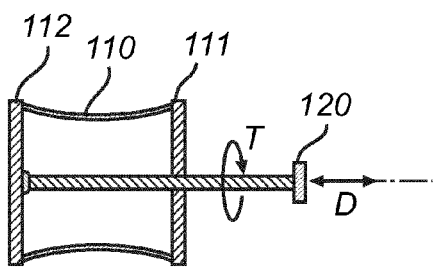
FIG. 4 schematically shows a cross-sectional view of the filter unit shown in FIG. 3 (in a collapsed state)

Further, the dust removing means 120 is configured to twist the filter body 110, as indicated by the arrow denoted T in the figures. The arrow T represents the motion of the dust removing means 120 around the central axis of the filter body 110 when twisting the filter body 110. By twisting the filter body 110, the filter body collapses without sticking out in a radial direction, such as shown in FIGS. 3 and 4. It will be appreciated that the dust removing means 120 may advantageously be configured to simultaneously pull (i.e. collapse) and twist the filter body 110. In other words, by simply pulling the rod (via e.g. manual operation along the direction D), the collapsible filter body 110 may be both twisted and compressed to reach its twisted and collapsed state, without any need of specific manual operation (or rotation) around the central axis of the collapsible filter body 110 for twisting the collapsible filter body 110. For this purpose, the rod 120 may comprise a mechanical system (not shown) arranged to rotate the rod, and thereby the collapsible filter body, around the central axis of the filter unit (as denoted by T in the figures) while only pulling the rod along the direction D.

According to another example, an end of the rod 120 may be securely attached at the top portion 112 of the filter body 110 and at least part of the (external) surface of the rod 120 may be equipped with a spiral groove (or, in other words, at least part of the rod 120 may be shaped as a (helical) screw) arranged to match or fit tracks formed in a hollow part of the bottom portion 111 of the filter body 110. As a result, upon rotation of the rod 120, the rod 120 rotates within the bottom portion 111 of the filter body 110 and the top portion 112 rotates relative to the bottom portion 111, thereby twisting the filter body 110. It will be appreciated that, with such a mechanical system, a rotation of the rod 120 also induces, depending on the orientation of the rotation of the rod 112, a collapse or an expansion of the filter body 110 along its central axis. The twist angle may for example be comprised in the range of about 10-360 degrees, preferably in the range of about 30-90 degrees. In particular, the dust removing means 120 may be configured to twist the filter body 110 by eight of a turn to a quarter turn (i.e. at a twist angle of about 45 to 90 degrees), which provides a sufficiently strong force, or energy, to remove most of the dust collected on the filter body 110. According to an embodiment the dust removing means is configured to collapse the filter body, preferably to a length in the range of about 10-80% of the un-collapsed length, and even more preferably in the range of about 30-50% of the un-collapsed length.

According to the embodiment shown in FIGS. 1-4, the filter body 110 may be made of a material arranged to maintain the filter body 110 in an expanded state. The present embodiment is advantageous in that there is no need of any external means for expanding the filter body 110. As a result, once the dust removing means 120 is released, either manually by the operator previously holding the rod 120 or automatically after a certain period of time, the filter body 110 immediately retrieves its original expanded state, as shown in FIGS. 1 and 2. The filter body 110 may be made of a semi-rigid material, for example a polymer-based material.

Figure 5:
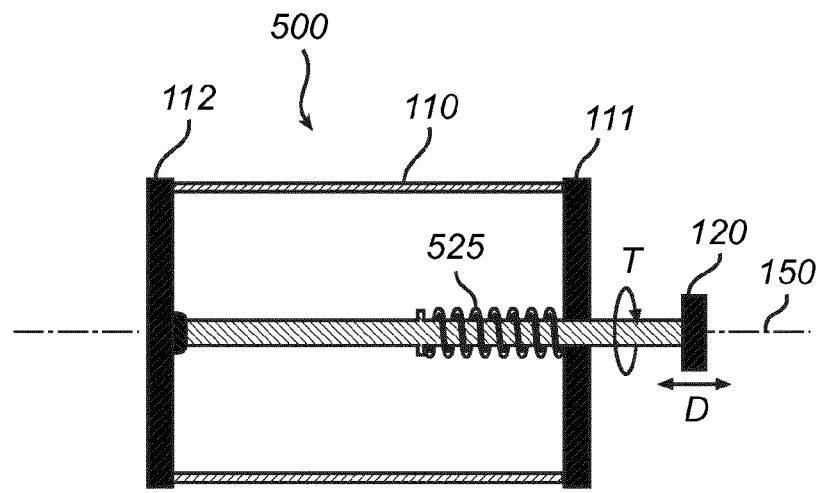
FIG. 5 schematically shows a filter unit for a vacuum cleaner according to another embodiment of the present invention.

With reference to FIG. 5, there is shown a schematic view of a filter unit according to another embodiment of the present invention.

FIG. 5 shows a filter unit 500 which is equivalent to the filter unit 100 described above with reference to FIGS. 1-4 except that the dust removing means 120 is configured to continuously apply a force on the portion 112 of the filter body 110 for expanding the filter body 110 by means of an elastic element, such as a spring 525, concentrically mounted on an axle arranged along the central axis 550 of the filter body 110.

It will be appreciated that it is also envisaged to provide a filter unit wherein the material of the filter body 110 itself and/or of the rod 120 itself may be arranged to maintain the filter body 110 in its expanded position as well as a spring may be provided to continuously apply a force on the portion 112 of the filter body 110 for expanding the filter body 110. Such a solution is advantageous in that it further increases the lifetime of the filter unit since it comprises alternative ways for repositioning the filter unit 500 in its original (expanded) state. With such a solution, the filter unit is e.g. less sensitive to aging of the filter body material, whose properties in retrieving its original state may deteriorate after a long-term use.

Figure 6:
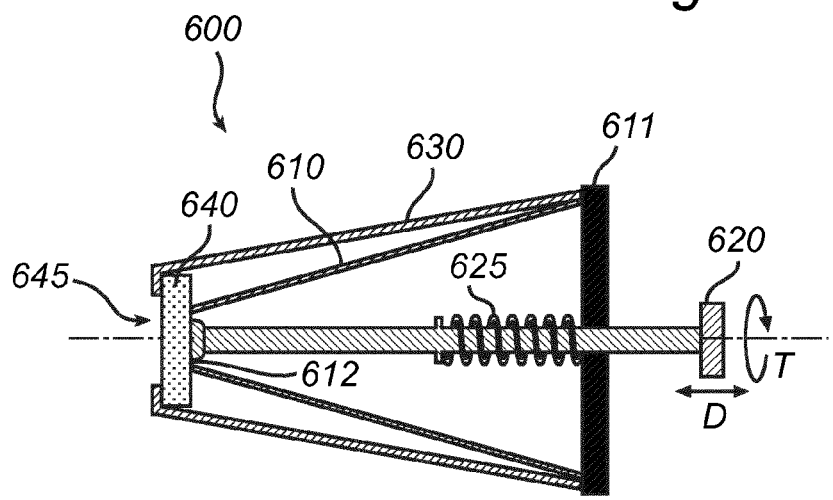
FIG. 6 schematically shows a filter unit for a vacuum cleaner according to yet another embodiment of the present invention.
Figure 7:
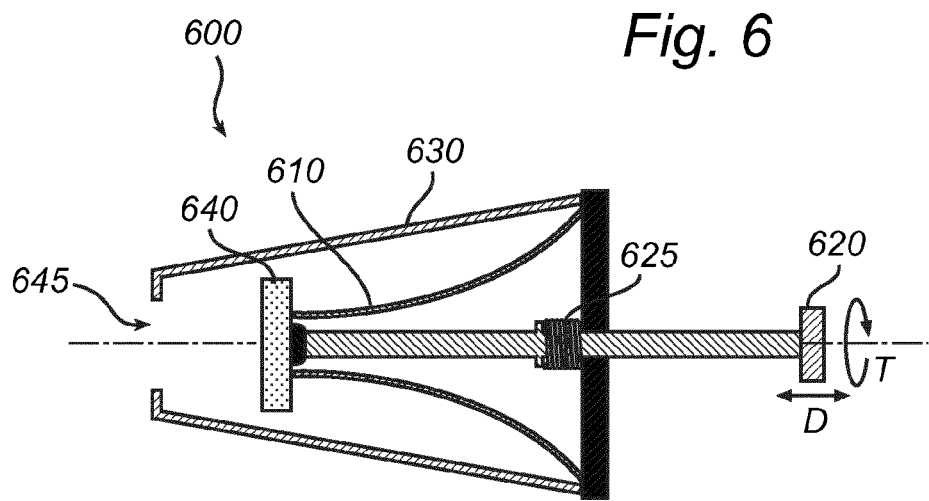
FIG. 7 shows the filter unit shown in FIG. 6 in a collapsed state.

With reference to FIGS. 6 and 7, there is shown a schematic view of a filter unit according to yet another embodiment of the present invention.

FIGS. 6 and 7 show a filter unit 600 which is equivalent to the filter unit 500 described with reference to FIG. 5 except that the filter body 610 is conically-shaped instead of being cylindrically-shaped and except that the filter unit 600 further comprises a coarse pre-filter body 630 and a sealing element 640.

Generally, the collapsible filter body of the filter unit may be substantially tube-shaped, such as shown in FIGS. 1-7. While FIGS. 1-5 show a cylindrically-shaped filter body, FIGS. 6 and 7 shows a conically-shaped filter body. Further, the cross-section of the filter body may be substantially elliptical, circular, rectangular or quadratic.

Turning back to FIG. 6, the filter unit 600 comprises a filter body 610 being elongated and at least partly flexible and a dust removing means 620 configured to collapse and expand the filter body 610 in response to a force applied on it. The filter body 610 further comprises pleats (not shown) extending along (the surface of) the filter body 610. The pleats extend from a bottom portion (or edge) 611 of the filter body 610 to a top portion (or edge) 612, opposite to the bottom portion 611, of the filter body 610, such as explained above with reference to FIG. 1.

Further, the filter unit 600 comprises a coarse pre-filter body 630 at least partially encompassing the collapsible filter body 610. The coarse pre-filter body 630 is made of a material adapted to filter particles, such as fibers and hair, which are larger than the particles filtered by the collapsible body filter 610. In a vacuum cleaner, the collapsible filter body 610 is arranged downstream of the coarse pre-filter 630. Further, the coarse pre-filter body 630 may have an opening 645 for conveniently letting out dust when cleaning the filter unit 600.

The at least partly flexible filter body 610 is advantageously arranged to collapse inwardly using e.g. the pull and twist function of the dust removing means 620.

Further, the filter unit 600 may comprise a sealing element 640 arranged at a portion 612 opposite to the portion 611 of the filter body 610 in direction of which the filter body 610 is configured to collapse. The sealing element 640 is attached to the portion 612 of the collapsible filter body 610 for closing the opening 645 of the coarse pre-filter body 630. The sealing element 640 may also assist in removing dust by partly scraping the interior of the pre-filter body 630 during filter cleaning, and provides an efficient seal between the coarse pre-filter 630 and the collapsible filter body 610 during operation of the vacuum cleaner.

Figure 8:
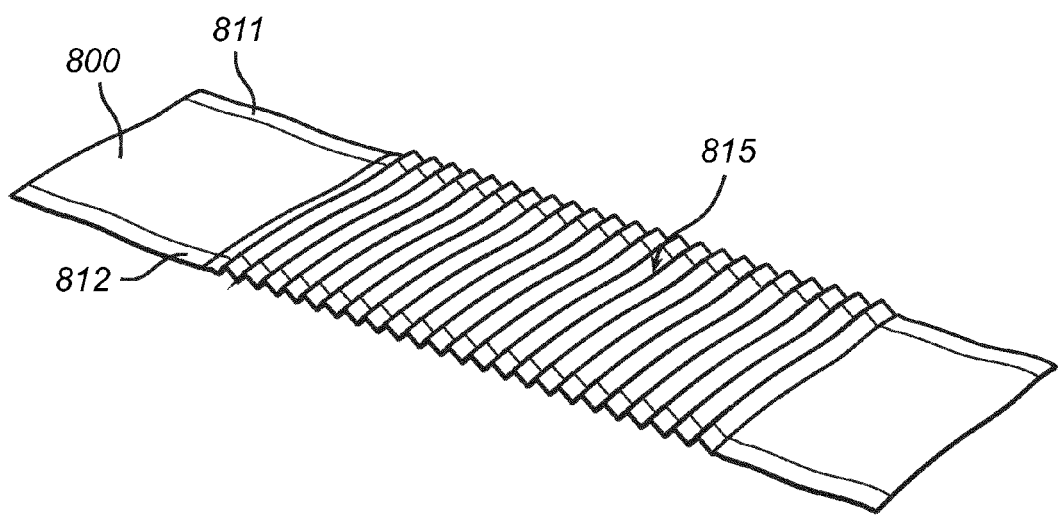
FIG. 8 schematically shows a sheet of at least partly flexible filter material for illustrating a method of manufacturing a filter unit in accordance with an embodiment of the present invention.

With reference to FIG. 8, a method of manufacturing a filter unit is described.

The method comprises the step of providing an elongated and at least partly flexible filter sheet 800 with pleats 815 extending from an edge 811 of the sheet 800 to an opposite edge 812 of the sheet 800. Thus, the method comprises a first step of pleat-forming a sheet of at least partly flexible (or pliable) filter material. In order to make the pleated filter collapsible, the material of the filter body is preferably soft or at least semi-rigid. The method further comprises the step of rolling the sheet (in a direction substantially perpendicular to the pleats) for forming a tube-shaped filter body, such as shown in e.g. FIG. 1.

Prior art to rolling, the method may comprise the step of stiffening at least one edge 811 or 812 of the sheet 800 such that the rest of the sheet remains flexible. The edge 811 or 812 of the sheet 800 may be stiffened by for example laminating or gluing a strip of rigid plastic film onto the edge 811 or 812. Alternatively, if the filter body is made of a plastic spun-bond material such as nylon, the stiff edge 811 or 812 can be formed by heating the edge 811 or 812 of the sheet 800, thereby making the edge 811 or 812 more rigid. The stiffened edges then result in some kind of end caps for the collapsible filter body, as shown in FIG. 1. The pleats will appear when the top and bottom caps of the filter body are pushed apart by e.g. a spring like shown in FIG. 5 or thanks to the property of the material of the filter body itself, such as in the embodiment described with reference to FIGS. 1-4.

The method may then further comprise the step of providing a dust removing means (not shown) for expanding and collapsing the filter body in response to a force applied on the dust removing means. The rolled sheet and the dust removing means are then assembled such that a tube-shaped filter body is formed. At least part of the dust removing means, and in particular the spring (if any), is arranged inside the tube-shaped filter body.

The dust removing means is then partly connected and attached to a portion of the filter body such that the filter body can be collapsed and expanded by motion of the dust removing means.

With reference to FIG. 9, there is shown a schematic view of a vacuum cleaner according to an embodiment of the present invention.

FIG. 9 shows a cross-sectional view of a vacuum cleaner 900, and in particular an hand held vacuum cleaner, comprising a housing 901 having a handle 902, an on/off-switch 903 and an inlet 904 for suction of dust laden air. The suction is generated by means of a motor fan unit 906 arranged in the housing 901. When the vacuum cleaner 900 is operated, air flows from the inlet 904 of the vacuum cleaner 900, into an inlet opening 908 of a dust container 907, through a filter unit 980, past the motor fan unit 906, and finally the air exits the vacuum cleaner 900 through outlets 905.

The motor fan unit 906 may be powered by batteries 909 arranged in the handle 902 and turned on or off by means of the on/off-switch 903. Preferably the batteries 909 are rechargeable and preferably the housing 901 comprises a power-inlet and electrical circuits (not shown) for reloading the batteries 909. Alternatively, the vacuum cleaner may be powered by connection to standard electrical mains (not shown).

As described above, dust laden air flows through the filter unit 980 during operation and thereby the air is filtered by the filter unit 980 which traps dust, fibers, hair, sand and other particles. Some of the sucked up particles adhere to the filter unit 980, but most are trapped in a lowermost part of the dust container 907. The dust container 907 is emptied, for example, by opening a lid 912 belonging to the dust container 907 and by allowing the dust to exit the lid opening, or by removing the dust container 907 from the housing 901 and allowing dust to escape from an opening 913 of the dust container 907.

The filter unit 980 may be any one of the filter units described above with reference to FIGS. 1-7. The vacuum cleaner of the present invention is advantageous in that the risk of clogging at the filter unit is reduced and, thus, a more effective vacuum cleaning is achieved.

Further, the filter unit may comprise an attachment member (not shown) for attaching the filter unit to any of the housing 901 and the dust container 907, which provides a fast and user friendly attachment of the filter unit 980. The attachment member may for example support the dust removing means of the filter unit 980.

It will be appreciated that the filter unit of the present invention may be incorporated in any kind of vacuum cleaners and that the hand held vacuum cleaner shown in FIG. 9 is only an example. The present invention is applicable to both large-size vacuum cleaners for vacuum cleaning large surfaces in e.g. industrial or household applications and small vacuum cleaners intended for vacuum cleaning small surfaces, such as hand held vacuum cleaners and also stick vacuum cleaners.

Further, it will be appreciated that the filter unit of the present invention may be used for upgrading already existing vacuum cleaners, thereby increasing their vacuum cleaning efficiency in that the risk for clogging at the filter unit is reduced.

It will be appreciated that embodiments specifically described with reference to the filter unit shown in FIGS. 1-4 may also be applied to the filter units described with reference to any one of FIGS. 5-7 and vice versa. Further, the embodiments described with reference to FIGS. 1-7 may also be applied to the method of manufacturing a filter unit as described above with reference to FIG. 8.

While specific embodiments have been described, the skilled person will understand that various modifications and alterations are conceivable within the scope as defined in the appended claims.

The invention claimed is:

1. A filter unit for a vacuum cleaner, said filter unit comprising:
   a filter body being elongated and at least partly flexible, and
   a dust removing mechanism configured to collapse and expand the filter body in response to a force applied on the dust removing mechanism,
   the filter body comprises pleats extending along the filter body, and wherein the dust removing mechanism is configured to twist the filter body at an angle in the range of about 10-360 degrees.

2. A filter unit as defined in claim 1, wherein the pleats extend along a direction of expansion of the filter body from a collapsed state to an expanded state.

3. A filter unit as defined in claim 1, wherein the dust removing mechanism is configured to collapse the filter body, to a length in the range of about 10-80% of the un-collapsed length.

4. A filter unit as defined in claim 1, wherein the filter body is made of a material arranged to maintain the filter body in an expanded state.

5. A filter unit as defined in claim 1, wherein the dust removing mechanism is configured to continuously apply a force on a portion of the filter body for expanding the filter body.

6. A filter unit as defined in claim 5, further comprising a resilient element adapted to exert the continuously applied force.

7. A filter unit as defined in claim 6, wherein the resilient element is a spring.

8. A filter unit as defined in claim 1, wherein the dust removing mechanism comprises a rod connected to a portion of the filter body, said rod being arranged to move the filter body between a collapsed state and an expanded state.

9. A filter unit as defined in claim 1, wherein the filter body is substantially tube-shaped, cylindrically-shaped or conically-shaped and/or wherein the cross-section of the filter body is substantially elliptical, circular, rectangular or quadratic.

10. A filter unit as defined in claim 1, wherein the filter body is arranged to collapse inwardly.

11. A filter unit as defined in claim 1, wherein the filter body comprises at least one stiff edge at which the pleats terminate.

12. A filter unit as defined in claim 1, wherein the filter body is made of a soft spun-bond material, plastics or a mesh material.

13. A filter unit as defined in claim 1, further comprising a sealing element arranged at a portion of the filter body opposite to the portion of the filter body in direction of which the filter body is arranged to collapse.

14. A vacuum cleaner comprising a filter unit as defined in claim 1.

15. A vacuum cleaner as defined in claim 14, further comprising a housing with a dust container comprising an inlet arranged to receive dust laden air and a motor fan unit for generating a flow of air through the inlet and the filter unit.

16. A filter unit as defined in claim 1, wherein said angle is in the range of about 30-90 degrees.

17. A filter unit as defined in claim 1, wherein the dust removing mechanism is configured to collapse the filter body to a length in the range of about 30-50% of the un-collapsed length.

18. A filter unit as defined in claim 2, wherein the dust removing mechanism is configured to collapse the filter body to a length in the range of about 10-80% of the un-collapsed length.

19. A filter unit as defined in claim 2, wherein the filter body is made of a material arranged to maintain the filter body in an expanded state.

20. A filter unit as defined in claim 2, wherein the dust removing mechanism comprises a rod connected to a portion of the filter body, said rod being arranged to move the filter body between a collapsed state and an expanded state.

* * * * *